United States Patent [19]

Hunt

[11] Patent Number: 4,719,592
[45] Date of Patent: Jan. 12, 1988

[54] SEQUENCE GENERATOR

[75] Inventor: David J. Hunt, Hitchin, England

[73] Assignee: International Computers Limited, London, England

[21] Appl. No.: 545,519

[22] Filed: Oct. 26, 1983

[30] Foreign Application Priority Data

Nov. 20, 1982 [GB] United Kingdom ................ 8233177

[51] Int. Cl.⁴ .............................................. G06F 7/58
[52] U.S. Cl. .................................................... 364/900
[58] Field of Search ... 364/200 MS File, 900 MS File, 364/717-722, 715

[56] References Cited

U.S. PATENT DOCUMENTS

| 3,898,448 | 8/1975 | Clark | 364/718 |
|---|---|---|---|
| 4,031,519 | 6/1977 | Findley | 364/900 |
| 4,079,451 | 3/1978 | Woods et al. | 364/200 |
| 4,080,648 | 3/1978 | Asano et al. | 364/200 |
| 4,116,103 | 9/1978 | Deutsch | 364/718 X |
| 4,202,035 | 5/1980 | Lane | 364/200 |
| 4,323,963 | 4/1982 | Wu | 364/200 |
| 4,337,510 | 6/1982 | Maezumi | 364/200 |
| 4,408,276 | 10/1983 | Nishibe | 364/200 |
| 4,460,972 | 7/1984 | Homan et al. | 364/900 |
| 4,541,045 | 9/1985 | Kromer, III | 364/200 |
| 4,598,245 | 7/1986 | Groves et al. | 324/73 R |
| 4,599,700 | 7/1986 | Kerdoncuff et al. | 364/721 |

OTHER PUBLICATIONS

Sippl, C. J. and Sippl, R. J., Computer Dictionary and Handbook, Howard W. Sams and Co., 1980, p. 180.

Primary Examiner—Gary V. Harkcom
Assistant Examiner—David L. Clark
Attorney, Agent, or Firm—Lee, Smith & Zickert

[57] ABSTRACT

A sequence generator for producing a sequence of binary numbers, comprises a counter, a priority encoder which encodes the contents of the counter, a memory addressed by the output of the encoder, an output register, and a logic circuit for modifying the contents of the output register as specified by the output from the memory. The generated sequence can readily be modified by changing the contents of the memory. The flexibility of the generator can be increased further by using as the counter a count register which is incremented by values from a further memory also addressed by the output of the encoder.

6 Claims, 3 Drawing Figures

SEQUENCE GENERATOR

BACKGROUND TO THE INVENTION

This invention relates to sequence generators for producing sequences of binary numbers. More specifically, the invention is concerned with a generator which can easily be adjusted to produce a variety of different sequences.

One way of generating a sequence of binary numbers is to store the whole sequence in a memory and to address the memory with a counter so as to read out each number in turn. The sequence can then easily be altered simply by re-programming the memory. However, this is very expensive in terms of memory, particularly in the case of long sequences.

Another possibility would be to use a binary counter with its outputs connected to a set of multiplexers which can be switched to produce a specified permutation of the output bits. However, this requires a large number of multiplexers and hence would be expensive. Moreover, the sequence length would not be variable but would be limited to the cycle length of the counter.

The object of the present invention is to provide a novel sequence generator which does not require a large memory or a large number of multiplexers.

SUMMARY OF THE INVENTION

According to the invention there is provided a sequence generator comprising:

a counter an encoder arranged to encode the contents of the counter so as to produce a code indicating the position of the first bit of a predetermined value (i.e. either 0 or 1) in the counter, memory containing a plurality of control words, the memory being addressed by said code so as to select one of the control words, an output register, and an adder for adding the selected control word to the output register.

It can be seen that as the counter steps through its count sequence, control words are selected from the memory and used to modify the contents of the output register, causing the output register to step through a sequence of values. This sequence can readily be varied by changing the contents of the memory.

Conveniently, the memory comprises a random access memory (RAM). Usually, the memory will contain the same number of locations as there are bit positions in the counter, and usually the output register and each control word will also contain this same number of bits.

The adder may be a normal binary adder with carry between its stages. Alternatively, it may add each pair of bits independently without carry, in which case it consists of a set of exclusive-OR gates, one for each bit in the output register.

In one form of the invention, the counter may comprise a count register for holding the current count value, a further memory holding a plurality of count increments, the further memory also being addressed by said code so as to select one of the count increments, and a further adder for adding the selected count increment to the current count value in the count register. As will be shown, this form of the invention is particularly flexible in allowing sequences of varying lengths to be produced.

One particular application for a sequence generator in accordance with the invention is for producing a sequence of addresses for addressing a data buffer, so as to read or write data items in various different sequences. This could be used, for example, to re-organise data in transit between different parts of a data processing system.

Two embodiments of the invention will now be described by way of example with reference to the accompanying drawings.

DESCRIPTION OF THE EMBODIMENTS OF THE INVENTION

Figure 1:
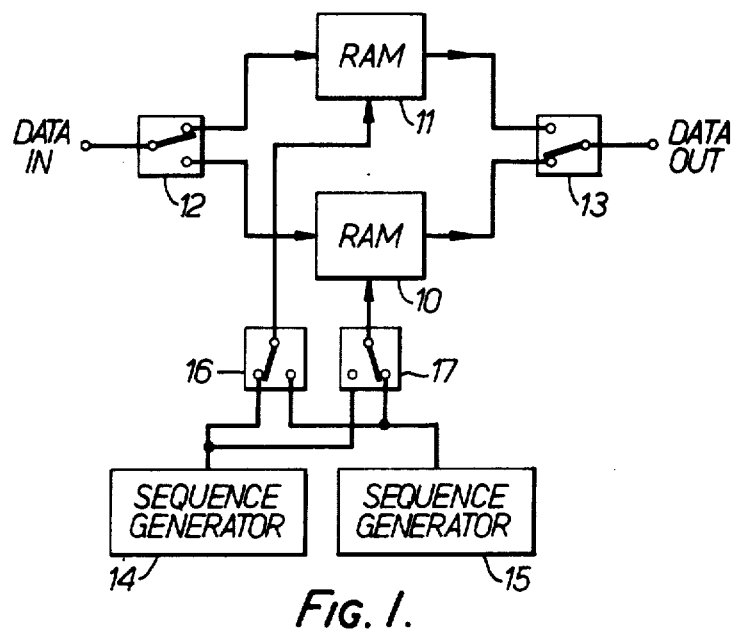
FIG. 1 is a block diagram of a double buffer arrangement for re-organising data.

Referring to FIG. 1, this shows a double buffer arrangement which can be used for re-organising data in transit between two parts of a data processing system.

The arrangement comprises two random access memories (RAMs) 10, 11 with switches 12,13 which permit data to be written into either RAM while it is being read out of the other. Two sequence generators 14,15 are provided, and these are connected to the address inputs of the RAMs by way of switches 16,17. The switches 16,17 are set in such a manner that one generator 14 addresses the RAM which is currently being written into, while the other generator 15 addresses with RAM which is currently being read.

Generator 14 is a normal binary counter which produces the standard binary count sequence, while generator 15, is a variable sequence generator in accordance with the invention. (Alternatively, both generators 14,15 could be variable generators in accordance with the invention, or generator 14 could be variable and generator 15 a standard counter.) By suitably programming the generator 15 to produce different sequences of addresses, the buffer arrangement may be made to perform various re-organisations of the data. For example, it may receive a matrix of data in row-major order, and read it out in column-major order.

Figure 2:
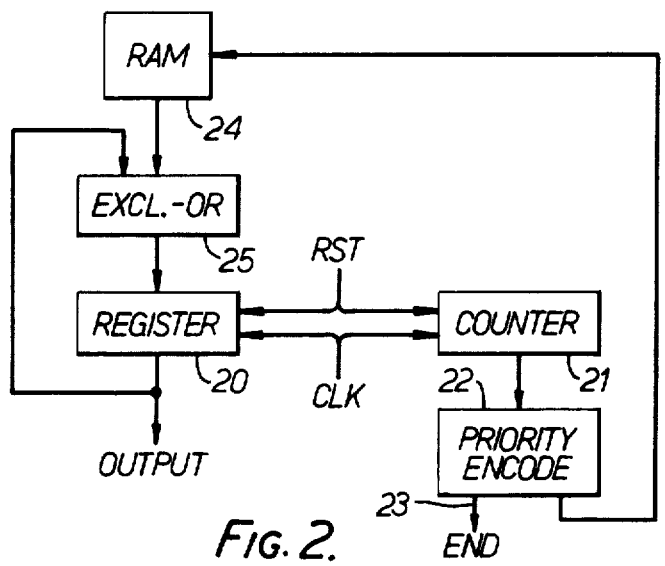
FIG. 2 is a block diagram of a sequence generator in accordance with the invention.

Referring now to FIG. 2, this shows one possible form of variable sequence generator.

The desired sequence of binary numbers is generated in a 4-bit output register 20. This register can be initially reset to the zero state (0000) by a reset signal RST.

The sequence generator also includes a 4-bit binary counter 21 which is incremented by a clock signal CLK. The counter 21 can be initially reset to the zero state by means of the reset signal RST, and will then count up through the normal binary sequence up to the maximum value 1111 (15 in decimal notation).

The output of the counter 21 is fed to a priority encoder 22 which produces a two-bit code in the range 0–3 indicating the position of the least significant zero in the counter, according to the following table

| Counter | Code |
|---------|------|
| ***0    | 0    |
| **01    | 1    |
| *011    | 2    |

| Counter | Code |
|---------|------|
| 0111    | 3    | where * signifies that this bit may be either 0 or 1. The encoder 22 also has a further output line 23 which produces a signal END when the counter reaches its maximum value 1111, and this is used to indicate the end of the sequence.

Priority encoders are well known in the computer art and so it is not necessary to describe the encoder 22 in detail.

The sequence generator also includes a RAM 24 having four word locations, each of which holds a four-bit control word. The RAM 24 is addressed by the code from the encoder 22 so as to select one of the four control words. The selected control word is combined with the current contents of the output register 20 by means of a set of four exclusive-OR gates 25, and the result is then gated back into the register 20 at the next clock pulse CLK. The effect of this exclusive-OR operation is to invert each bit in the register 20 which corresponds to a "1" bit in the control word.

In summary, it can be seen that as the counter 21 steps through its count sequence, various control words are selected from the RAM 24. The selected words are used to modify the contents of the output register 20, by means of the exclusive-OR gates 25, causing the output register to step through a sequence of values. This sequence depends on the contents of the RAM 24 and hence can be modified by re-programming the RAM.

As an example of the operation of the sequence generator, the RAM 24 may be programmed as follows.

| address | contents |
|---------|----------|
| 0       | 0100     |
| 1       | 0110     |
| 2       | 1110     |
| 3       | 1111     |

Initially, the counter 21 and the output register 20 are both set to zero by means of the reset signal RST. The contents of the counter (0000) are encoded to produce the code 0. This code addresses the first location of the RAM 24 so as to read out the control word 0100. This control word is then combined with the contents of the output register (0000) and the result (0100) is then gated back into the register 20 at the next clock pulse. At the same time, the counter 21 is incremented to 0001. This is now encoded to produce the new code value 1, which addresses the second location of the RAM 24 so as to read out the control word 0110. This control word is then combined with the current contents of the output register (0100), and the result (0010) is gated back into the output register at the next clock pulse.

This process is repeated at each successive clock pulse until the counter 21 reaches the maximum count 1111, whereupon the end of sequence signal END is produced. The sequence of states of the counter 21, the output register 20, and the encoder 22 is summarised in the following table.

| Counter | encoder | output register |
|---------|---------|-----------------|
| 0000    | 0       | 0000            |
| 0001    | 1       | 0100            |
| 0010    | 0       | 0010            |
| 0011    | 2       | 0110            |
| 0100    | 0       | 1000            |
| 0101    | 1       | 1100            |
| 0110    | 0       | 1010            |
| 0111    | 3       | 1110            |
| 1000    | 0       | 0001            |
| .       | .       | .               |
| .       | .       | .               |
| .       | .       | .               |
| 1111    | END     | 1111            |

Different output sequences can be obtained by changing the contents of the RAM 24. In particular, it can be shown that permutation of the contents of the columns of the RAM 24 produces the corresponding permutation of the bits of the output register. For example, if the contents of the first and last columns of the RAM are interchanged, this has the effect of interchanging the first and last bit of each state of the output register. Other patterns of bits which are not permutations of the above pattern may also be used. For example, if the RAM is programmed with a diagonal pattern of ones, the resulting sequence in the output register is the well-known Gray code sequence.

Although the sequence generator in FIG. 2 produces a 4-bit output, it will be appreciated that a sequence generator in accordance with the invention can be constructed to produce any desired word length. For example, the output register may be a 16-bit register, and the counter may be a 16-bit counter. The RAM would then have 16 word locations, each containing a 16-bit control word.

Another possible modification of the generator shown in FIG. 2 would be to replace the set of exclusive-OR gates 25 with a conventional binary adder with carry between the stages. In this case, each control word in the RAM would represent an increment value for incrementing the contents of the output register.

In the above example, the length of the sequence was sixteen states; i.e. equal to the number of states of the counter 21. However, it would be possible to produce shorter sequences, by presetting the contents of the counter (and possibly also the output register) to a value other than zero. For example, if the counter was preset to the value 0111 (decimal 7), the sequence length would be 16−7=9.

Figure 3:
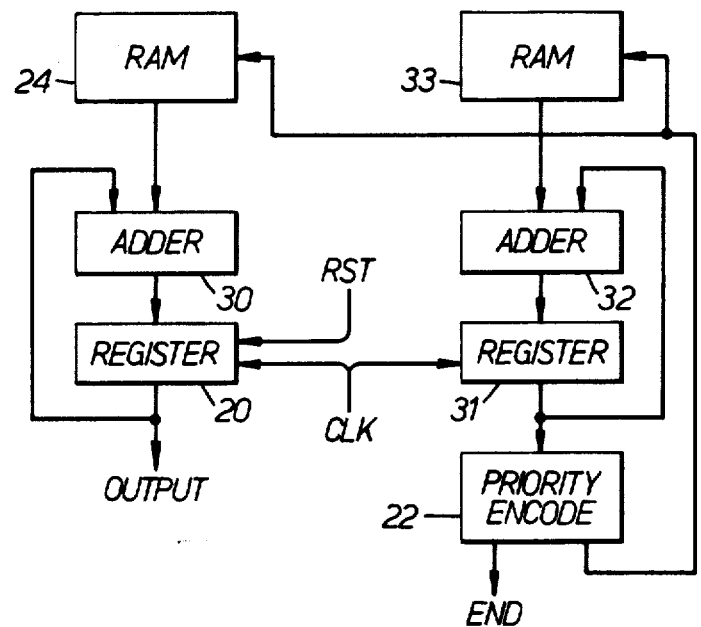
FIG. 3 is a block diagram of an alternative sequence generator in accordance with the invention.

Referring now to FIG. 3, this shows another embodiment of the invention. In this embodiment, the output register 20, the priority encoder 22 and the RAM 24 perform the same functions as the like-numbered items in FIG. 2. However, in this case, the set of exclusive-OR gates 25 is replaced by a conventional binary adder 30 with carry between its stages. Also, in this case, the counter 21 is replaced by a count register 31, an adder 32 and a further RAM 33, which holds increment values for the count register 31.

The output of the register 31 is fed to the priority encoder 22, and the resulting code is applied to the address input of the RAM 33 as well as to the RAM 24. The increment value read out of the RAM 33 is added to the current contents of the count register 31, by means of the adder 32, and the result is gated back into the count register 31 at the next clock pulse CLK.

For the purposes of the following example of operation of FIG. 3, it will be assumed that the registers 20, 31 are both 5 bits wide, and that the RAMs 24, 33 both have five 5-bit word locations. It will, of course be appreciated that in other embodiments of the invention different word lengths may be used.

The following table shows one possible way in which the RAMs 24,33 may be programmed.

| Address | RAM 33 | RAM 24 |
|---------|--------|--------|
| 0 | 000 01 | 01 000 |
| 1 | 000 01 | 01 000 |
| 2 | 000 10 | 10 001 |
| 3 | 000 10 | 10 001 |
| 4 | 000 10 | 10 001 |

It is assumed that the output register is initially set to zero, and that the count register is initially loaded with the value 011 01. The resulting sequence of states of the count register 31, encoder 22 and output register is as follows:

| Count register | encoder | output register |
|----------------|---------|-----------------|
| 011 01 | 1 | 00 000 |
| 011 10 | 0 | 01 000 |
| 011 11 | 4 | 10 000 |
| 100 01 | 1 | 00 001 |
| 100 10 | 0 | 01 001 |
| 100 11 | 2 | 10 001 |
| 101 01 | 1 | 00 010 |
| 101 10 | 0 | 01 010 |
| 101 11 | 3 | 10 010 |
| 110 01 | 1 | 00 011 |
| 110 10 | 0 | 01 011 |
| 110 11 | 2 | 10 011 |
| 111 01 | 1 | 00 100 |
| 111 10 | 0 | 01 100 |
| 111 11 | END | 10 100 |

It can be seen that the count register 31 is effectively divided into a 3-bit portion and a 2-bit portion. The 2-bit portion repeatedly cycles through the sequence 01, 10, 11 and hence acts as a divide-by-three counter. The 3-bit portion is incremented each time the 2-bit portion re-cycles from 11 back to 01, and counts through the five-state sequence 011, 100, 101, 110, 111.

The increment value for stepping the 2-bit portion through its sequence is obtained from the first two locations of the RAM 33, each of which contains the value 000 01. The last three locations of the RAM 33 contain the increment value 000 10 which serves to step the 2-bit portion from 11 to 01 at the end of its three-state cycle, and also serves to increment the 3-bit portion by one.

The RAM 24 acts in the same way as in FIG. 2, to provide a permutation, as described above.

In summary, it can be seen that the result of programming the RAMs 24, 33 as shown is effectively to produce a divide-by-five counter which is driven by the overflow from a divide-by-three counter. This would be useful, for example, in addressing a 5×3 matrix of data items.

Clearly, the RAMs 24,33 could be programmed in many different ways to produce different count sequences in the count register 31 and different output sequences in the output register 20. In particular, it can be seen that by suitably programming the RAM 33 and choosing suitable initial value for the contents of the count register, the count register can effectively be split into various combinations of counters.

I claim:

1. A sequence generator comprising:
   (a) a counter having an output,
   (b) priority encoding means connected to the output of the counter, for producing an output code identifying a first bit of a predetermined value in the output of the counter,
   (c) a memory containing a plurality of control words and having an address input for addressing the control words and a data output for outputting the control words, the address input being connected to receive the output code from the priority encoder,
   (d) an output register having an input and an output, and
   (e) an adder having first and second inputs and an output, the first input being connected to the data output of the memory, the second input being connected to the output of the output register, and the output of the adder being connected to the input of the output register,
   whereby a sequence of output values is provided in said output register.

2. A sequence generator according to claim 1 wherein the number of control words in the memory is equal to the number of bit positions in the counter.

3. A sequence generator according to claim 2 wherein the output register and the control words each have the same number of bit positions as the counter.

4. A sequence generator according to claim 1 in combination with a buffer memory having a data input, a data output, and an address input, the address input of the buffer memory being connected to the output of the output register of the sequence generator.

5. A sequence generator comprising:
   (a) a counter having an output,
   (b) priority encoding means connected to the output of the counter, for producing an output code identifying a first bit of a predetermined value in the output of the counter,
   (c) a memory containing a plurality of control words and having an address input for addressing the control words and a data output for outputting the control words, the address input being connected to receive the output code from the priority encoder,
   (d) an output register having an input and an output,
   (e) an exclusive-OR circuit having first and second inputs and an output, the first input being connected to the data output of the memory, the second input being connected to the output of the output register, and the output of the exclusive-OR circuit being connected to the input of the output register,
   whereby a sequence of output values is produced in said output register.

6. A sequence generator comprising:
   (a) a first register having an input and an output,
   (b) priority encoding means connected to the output of the first register, for producing an output code identifying a first bit of a predetermined value in the output of the counter,
   (c) a first memory containing a plurality of increment values and having an address input for addressing the increment values and a data output for outputting the increment values, the address input being connected to receive the output code from the priority encoder, (d) a first adder having first and second inputs and an output, the first input being connected to the data output of the first memory, the second input being connected to the output of the first register, and the output of the first adder being connected to the input of the first register, (e) a second memory containing a plurality of control words and having an address input for addressing the control words and a data output for outputting the control words, the address input of the second memory being connected to receive the output code from the priority encoder, (f) an output register having an input and an output, and (g) a second adder having first and second inputs and an output, the first input of the second adder being connected to the data output of the second memory, the second input of the second adder being connected to the output of the output register, and the output of the second adder being connected to the input of the output register, whereby a sequence of output values is produced in said output register.

* * * * *